United States Patent [19]
Turlach et al.

[11] Patent Number: 5,314,281
[45] Date of Patent: May 24, 1994

[54] TOLERANCE RIVET FOR HIGHLY STRESSED RIVETED JOINTS

[75] Inventors: Gerhard Turlach, Osterode a.H.; Walter J. Mages, Alsfeld, both of Fed. Rep. of Germany

[73] Assignee: Kamax-Werke Rudolf Kellermann GmbH & Co. KG, Osterode, Fed. Rep. of Germany

[21] Appl. No.: 61,821

[22] Filed: May 13, 1993

Related U.S. Application Data

[63] Continuation of Ser. No. 624,609, Dec. 10, 1990, abandoned.

[30] Foreign Application Priority Data

Nov. 2, 1990 [DE] Fed. Rep. of Germany ....... 4034862

[51] Int. Cl.$^5$ .............................................. F16B 19/00
[52] U.S. Cl. ............................................................ 411/361
[58] Field of Search ..................... 411/361, 360, 339

[56] References Cited

U.S. PATENT DOCUMENTS

| | | | |
|---|---|---|---|
| 2,396,661 | 3/1946 | Keller et al. | 411/361 |
| 2,955,505 | 10/1960 | Schuster | 411/361 |
| 3,915,053 | 10/1975 | Ruhl | 411/361 |
| 4,233,879 | 11/1980 | Sigmund | 411/361 |
| 4,326,825 | 4/1982 | Volkmann et al. | 411/361 X |
| 4,472,096 | 9/1984 | Ruhl et al. | 411/361 |
| 4,540,447 | 9/1985 | Mercer | 411/361 X |

FOREIGN PATENT DOCUMENTS 2083583 3/1982 United Kingdom ................ 411/361

Primary Examiner—Rodney M. Lindsey
Attorney, Agent, or Firm—Max Fogiel

[57] ABSTRACT

A tolerance river for highly stressed riveted joints possessing a shank (3) whose length is harmonized with the two components to be joined, followed by a retaining piece (5) interacting with a retaining collar and provided with grooves (9) on its circumference. An enveloping jacket (12) which links the root diameters d1, d2 of the grooves, widenes conically from the head of the tolerance rivet toward its opposite free end. The grooves (9) on the retaining piece (5) have decreasing groove width a1, a2, etc., and increasing asymmetry of the groove profile. The first groove (9) located at the retaining piece (5) of the tolerance rivet that is located after the shank (3) in the direction toward its free end, possesses rounded shaping r3 in the area of its root diameter d1 whose area (13) is strain-hardened.

9 Claims, 4 Drawing Sheets

TOLERANCE RIVET FOR HIGHLY STRESSED RIVETED JOINTS

The present application is a continuation of the parent U.S. application Ser. No. 624,609 filed Dec. 10, 1990 now abandoned.

The invention relates to a tolerance rivet for highly stressed riveted joints comprising a rivet head and a free end located opposite to said head; a shank with a length dependent on two components to be joined by said rivet; and a retaining element cooperating with a retaining collar and having at least four grooves.

A tolerance rivet of this type is known from DE-PS 32 15 228. Immediately after the retaining piece with the grooves, the tolerance rivet possesses a tear-off groove forming a single predetermined breaking point and a subsequent tear-off piece The grooves on the circumference of the retaining piece have V-shaped sections in the direction from the tolerance rivet head toward its opposite free end with groove angles decreasing in the same direction, thus leading to a stepwise decreasing groove width in this direction, if the projecting parts between the grooves end on a cylindrical enveloping jacket. In connection with an enveloping jacket connecting the root diameters of the grooves and widening conically from the tolerance rivet head toward its opposite free end, the groove depth decreases in this direction. Besides, in this direction the V-shaped sections of the various grooves are arranged with different inclinations thus leading to an increasing asymmetry of the groove profile in the direction toward the free end of the retaining piece.

In the case of special applications, i.e. if the components to be braced are subject to a gaping motion, that is a swivel motion of the components against one another across an axis situated in its tangent plane, there may be premature damage done to the tolerance rivet in the area of the retaining piece, thus impairing service life. Such stresses may occur for example in the case of structures in airplanes. In the case of excessive stress, there is danger of breakage at such tolerance rivets.

From US-PS 3 915 053 another tolerance rivet is known in the case of which there is also one single tear-off groove serving as predetermined breaking point so that the length of the tolerance rivet shank is harmonized with the thickness of the components to be joined. Hence, tolerance rivets with shanks of various lengths are required for different component thicknesses. In order to distribute the stress at the retaining piece and at the retaining collar as equally as possible onto the axial extension of the grooves of the retaining piece, the groove section from the shank toward the tear-off groove is increased and/or also the depth of the grooves—if seen radially—is enhanced in this direction. This creates an enclosing jacket connecting the root diameters of the grooves, which widens conically from the free end of the tolerance rivet toward the head or shank. Therefore, the enclosing jacket is arranged in an inversely conical way when compared to the tolerance rivet of the kind mentioned at the outset. However, in the direction from the head to the tear-off groove, groove width is increased also in this case. Such a design facilitates the putting-on of the retaining collar to be formed and of the clamping tool. Nonetheless, the flowage of the material of the retaining collar into the grooves is not satisfactory because the grooves located next to the head have a smaller section, while the material of the retaining collar next to the tear-off groove is subject to the greatest deformation, i.e. it flows best in this place.

SUMMARY OF THE INVENTION

It is the object of this invention to the increase the dynamic carrying capacity of a tolerance rivet having the characteristics described at the outset, in Therefore the invention provides a tolerance rivet for highly stressed riveted joints, comprising: a rivet head and a free end located opposite to said head; a shank with a length dependent on two members to be jointed by said rivet; and a retaining element cooperating with a retaining collar and having at least four circular grooves, wherein said retaining element having a constant outer diameter being slightly smaller than an outer diameter of said shank; said grooves on said retaining element having root diameters on an enveloping jacket linking said root diameters of said grooves and widening frusto conically in a direction from said head toward said opposite free end; said grooves on said retaining element having a groove profile with (a) an angle of opening decreasing continuously in said direction, (b) a groove width decreasing continuously in said direction, (c) an inclination of a supporting flank of the grooves increasing continuously in said direction and (d) an asymmetry increasing continuously in said direction; said retaining element having a first groove adjacent said shank with a rounded shape in a strain-hardened area of the root diameter of said first groove, said stain-hardened area facilitating deformation of said retaining collar by providing a smooth surface with reduced surface friction for greater flowability of said retaining collar in filling said first groove; said rounded shape on said first groove preventing fracture of the rivet due to stress concentration caused by forces working on said rivet at said respective riveted joint. The rounded shaping may consist of one or several radii, whereby none of the radii should be smaller than x mm. However, the strain-hardening of the first groove is of particular importance in connection with the rounded shaping, at least in the area of the root diameter or of the rounded shaping. By means of this strain-hardening process two effects are achieved. On the one hand, the dynamic carrying capacity of the tolerance rivet is increased where the tolerance rivet has its smallest diameter and where, on the other hand, it is subject to the greatest stress. A stress concentration which may possibly occur in the state of the art when arranging V-shaped grooves that even in their root diameter have more or less sharp edges is eliminated through the rounded shaping in connection with the strain-hardening, or its adverse effects are at least attenuated. At the same time, the strain-hardening leads to a smoothing and evening-out of the surface in this place so that here the material of the retaining collar encounters less friction and may therefore flow with greater ease. The larger the strain-hardened area, the greater are the consequences of this second effect. It is therefore not quite favorable to strain-harden only a small part of the surface of the first groove in the area of the root diameter; the strain-hardening may in fact also include the adjacent areas which do not belong to the rounded shaping of the groove root.

In this way, it is possible that the transition area of the shank coming after the root diameter of the first groove in the direction toward the head is also strain-hardened. Strain-hardening may be provided continuously from the root diameter of the first groove down to a certain depth of the shank length, that is in an area where the cylindric part of the shank has already been reached.

The transition area between the first groove and the shank following immediately after in the direction toward the head of the tolerance rivet may possess a shaping composed of several radii. Hence, also in this case a rounded shaping e.g. in the form of a three-center curve may be provided. The shaping may be the result of machining or a non-cutting shaping process, the strain-hardening being accomplished simultaneously with the non-cutting shaping. By means of this design, not only the hitherto described advantages are achieved. There exists the further advantage that the pressing-in process of the tolerance rivet shank into the bore hole of the components to be joined is facilitated. By means of the strain hardening the surface becomes smoother and the friction during the pressing-in process into the bore hole of the components is reduced. At the same time, it is avoided that damage is done to the bore hole during the pressing-in process. Such damage by striation is known in the state of the art. It is another advantage that by means of strain-hardening, shape and surface faults in the transition area of the shank toward the first groove are in general eliminated, also in the area of tolerances, and thus the dynamic carrying capacity in this area of the texture is increased.

The strain-hardened area(s) may be rolled. Such a rolling process represents a particularly simple and effective processing step, in order to accomplish the strain-hardening.

The surface of all or some of the grooves following the first groove may be shaped prior to or after a heat treatment by means of a non-cutting process. By this, the flow conditions of the material of the retaining collar are improved in this area of the retaining piece. Yet it is also possible that the surface in the area of the first groove possesses smooth texture and in the area of the subsequent grooves coarse texture. The smooth and the coarse texture may be accomplished by rolling. The smooth texture favors a better moulding of the material of the retaining collar into the grooves of the retaining piece. The coarse texture serves the purpose of increasing the transmissibility of the retention forces in the area of the grooves following the first groove. On the other hand, it is also possible that the surface in the area of the first groove is of a smooth texture and that in the area of the subsequent grooves it is of an even smoother texture. Both textures may be accomplished by rolling and strain-hardening, and they favor the flowage of the material of the retaining collar also in the area of the subsequent grooves.

Apart from rolling, there are other possibilities for accomplishing strain-hardening. Hence, the strain-hardened area(s) can also be accomplished by shot peening. When using spherical shot-peening material the surface is smoothened and strain-hardened. When using sharp-edged, splintery material the surface is made coarse.

BRIEF DESCRIPTION OF THE DRAWINGS

The invention is explained and described in further detail by means of different embodiments. The drawings represent as follows.

DESCRIPTION OF THE PREFERRED EMBODIMENTS

Figure 1:
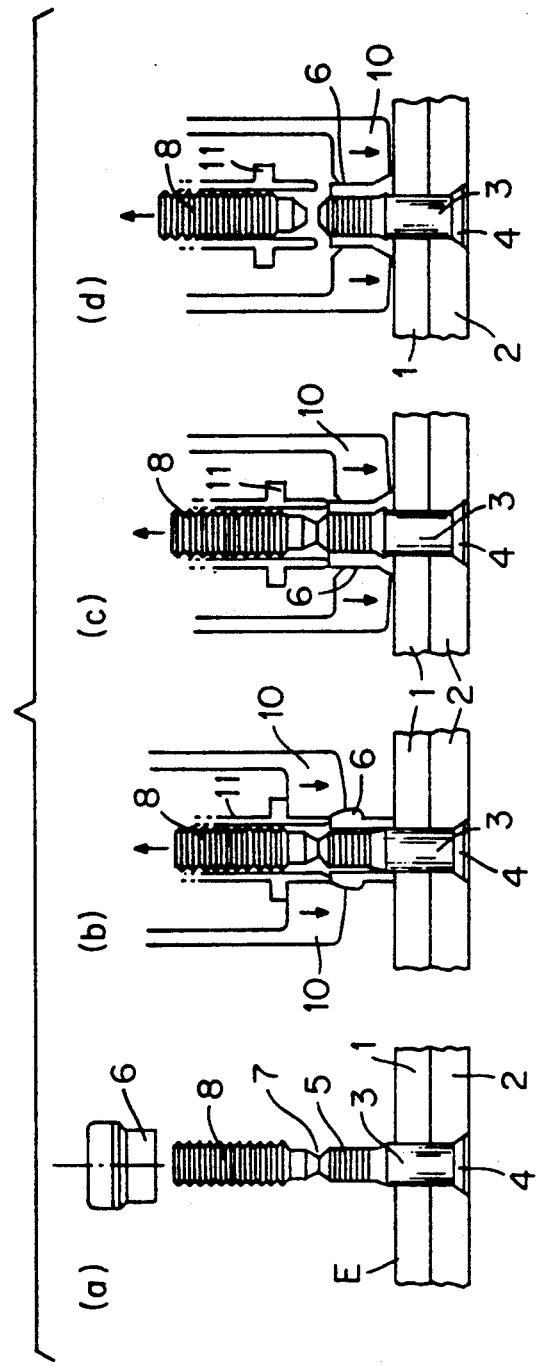
FIGS. 1A, 1B, 1C, 1D are schematic diagrams with several steps according to the setting process of a tolerance rivet.

The tolerance rivet is inserted into a prepared bore hole in the members 1 and 2 to be joined. It comprises a smooth, cylindrical shank 3 with a head 4 at one end. At the other end of the shank 3 the material of the tolerance rivet ends into a retaining element 5 equipped with circular grooves 9. The retaining element 5 cooperates with a retaining collar 6 made of a highly deformable, flowing material, for example of aluminum, and which flows into the grooves 9 of the retaining piece 5 when the retaining collar 6 is deformed during the setting process of the tolerance rivet. By way of a tear-off groove, a tear-off piece 8 forming a predetermined breaking point is connected to the retaining piece 5. The tear-off piece 8 is equipped with threads or turned grooves serving the purpose of receiving a clamping tool.

The process of the setting of the tolerance rivet is made clear by the sequence of FIGS. 1i a through 1d. According to FIG. 1a the tolerance rivet with its shank 3 is inserted into the bore hole of the components of members 1, 2 until its head 4 makes contact with the component of members 2. Then, the retaining collar 6 is slid on. It possesses a bore hole that permits its being slid onto the tolerance rivet. According to FIG. 1b, a clamping tool with its clamping jaws 10 is brought into action. In the course of this process a clamping bush 11 embraces the tear-off piece 8. By means of the clamping tool a high tensile stress acts upon the tolerance rivet, while at the same time the retaining collar 6 is deformed in a way that its material flows and is pressed, into the grooves 9 of the retaining piece or element 5. This can be seen in FIG. 1c. As soon as the tensile stress that is required for setting the tolerance rivet is exceeded, the deformation of the retaining collar 6 ends and the tear-off piece 8 breaks in the area of the tear-off groove 7 as is illustrated in FIG. 1d.

Figure 2:
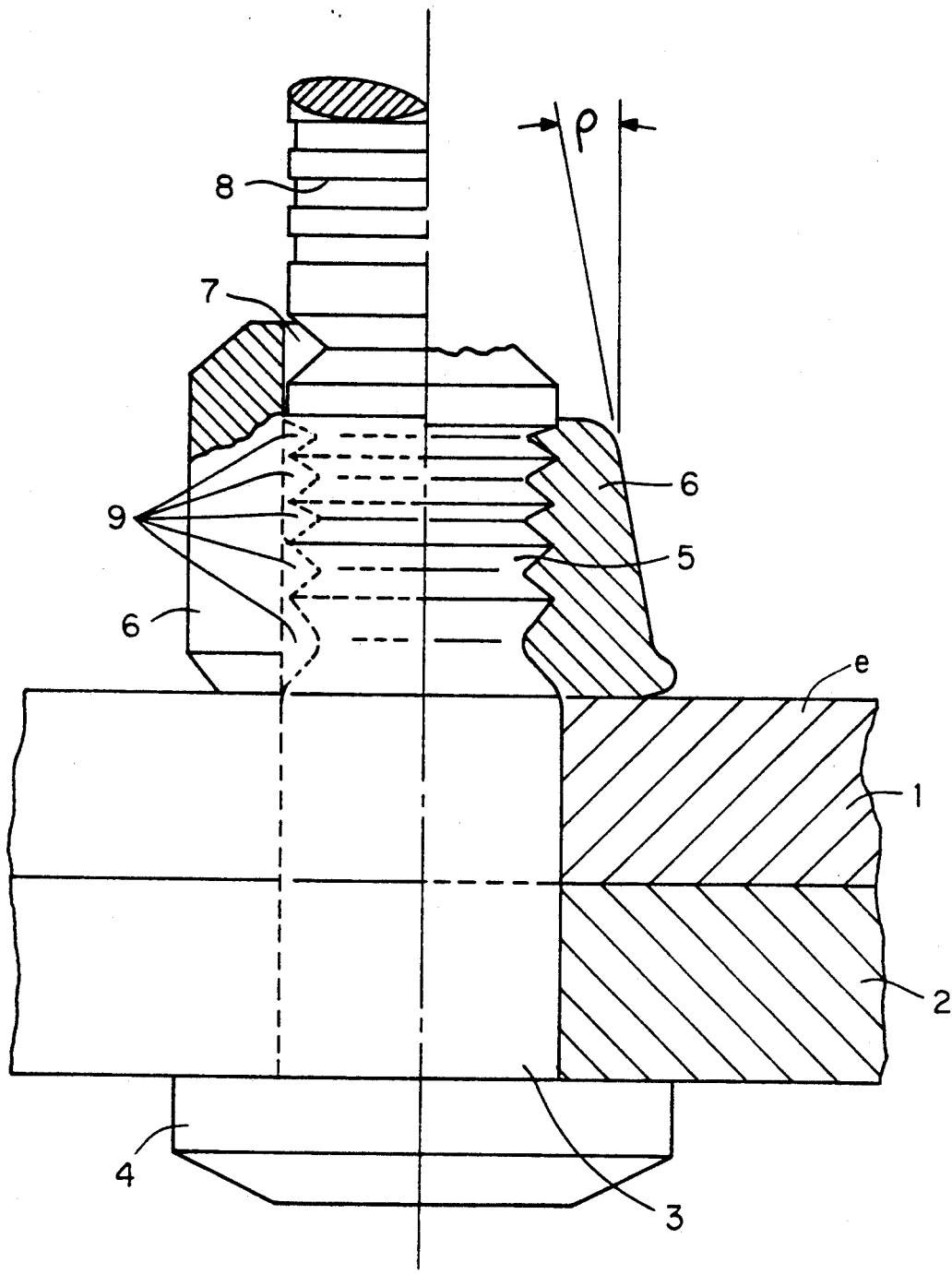
FIG. 2 is a sectional view demonstrating the change in shape of the retaining collar before and after the setting process.

FIG. 2 shows a blown-up view of details of the design and the interaction of the tolerance rivet in the area of the retaining piece 5 and the retaining collar 6. The left half of the drawing shows the retaining collar prior to its deformation and the right half represents the retaining collar after its deformation. The retaining collar 6 is deformed from an approximately cylindrical shape into conical shape, while in the area of a bearing surface its material will flow outwards in a bead-like way. During the setting process the retaining collar 6 is subject to omnilateral compressive strains until its total deformation. The very moment the tear-off piece 8 is torn off and the fastening device is pulled back, the stresses on acting the retaining collar 6 are relieved toward all sides. In this way there is also a relief between the tolerance rivet in the fastening area, and the invested prestress is decreasing somewhat. With the expected setting of the entire joint the retaining collar 6 is further relieved, which causes it to expand by elasticity and the deformation angle $\rho$(rho) to decrease.

Figure 3:
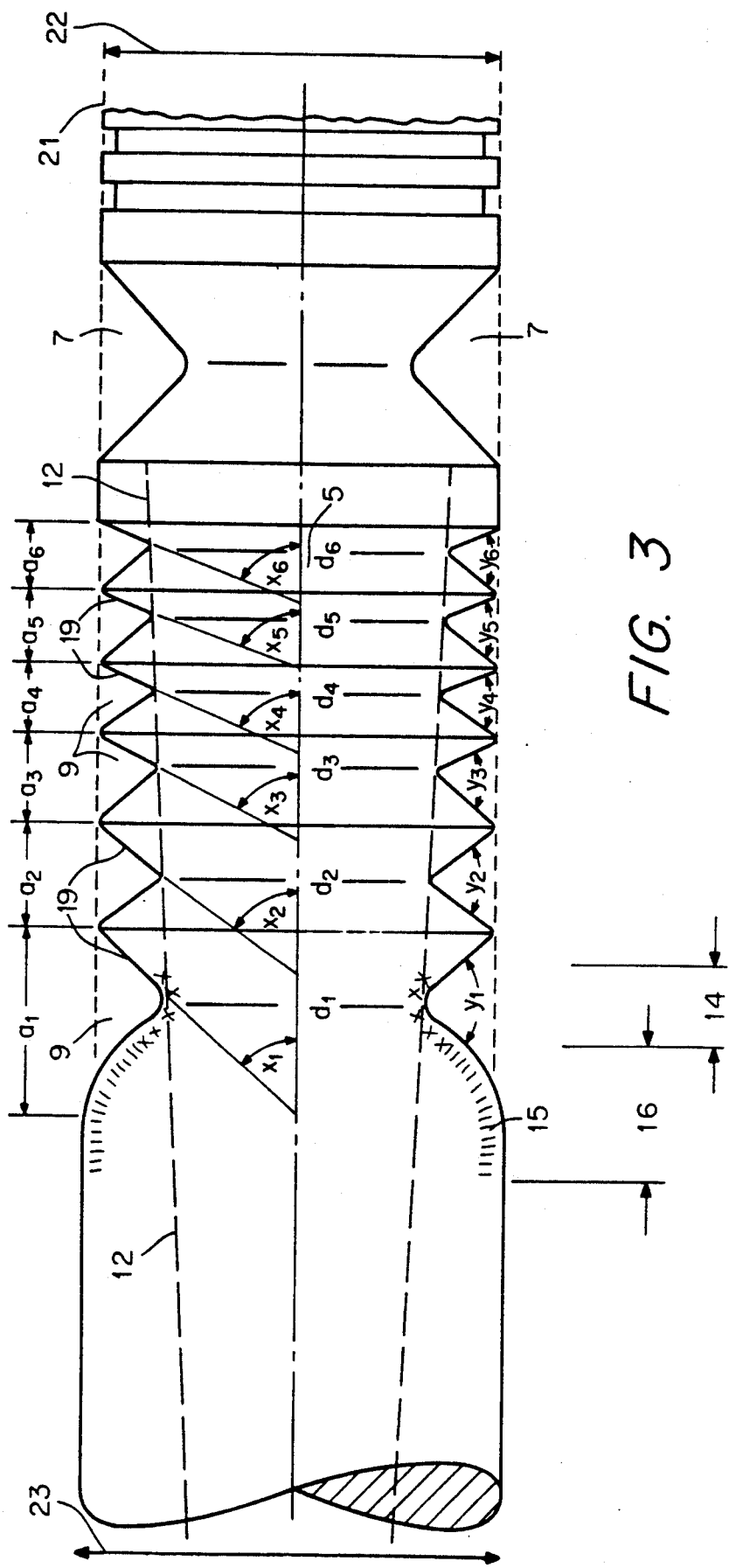
FIGS. 3 and 4 are detail drawings of tolerance rivets as tear-off type.
Figure 4:
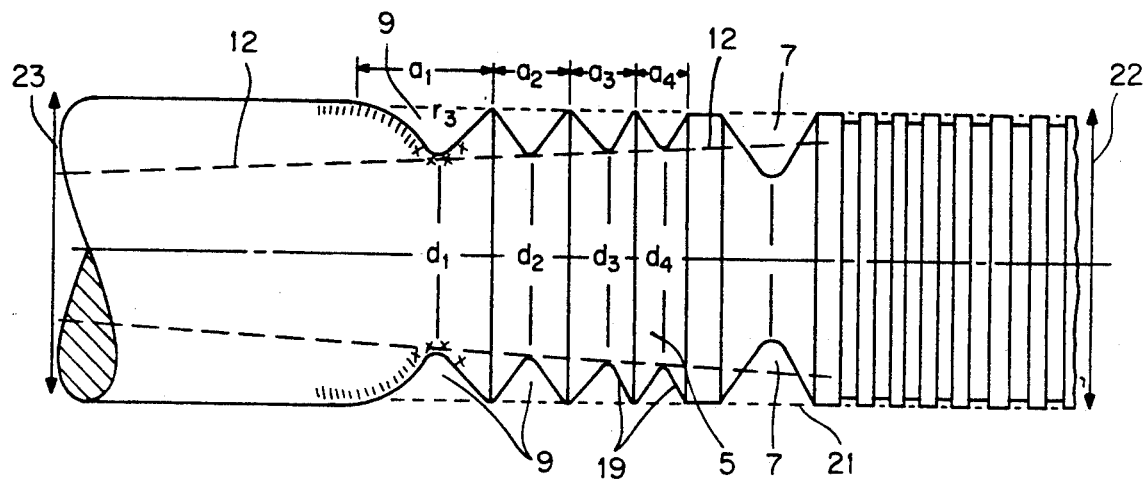
Figure 5:
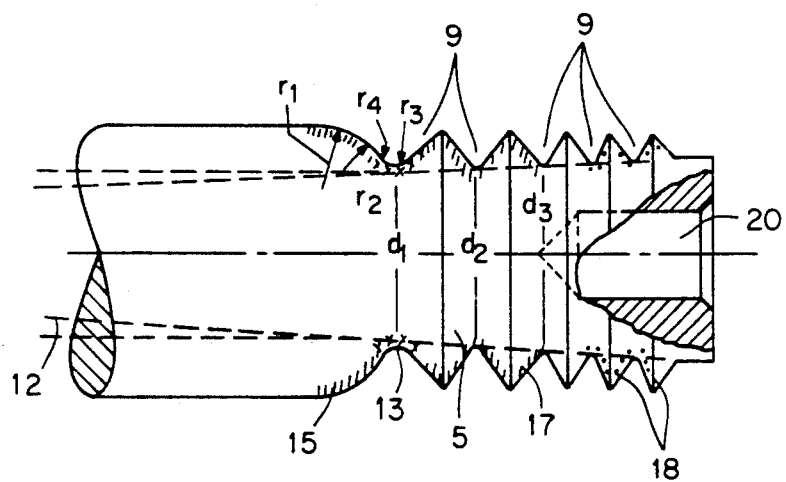
FIG. 5 is a detail drawing of the tolerance rivet as press-in type.

FIGS. 3 to 5 show further essential details of the tolerance rivet; both FIGS. 3 and 4 show a section of an embodiment of the tolerance rivet according to the tear-off type but of different length of the retaining element; and FIG. 4 is a view of a press-in tolerance rivet. In the area of the retaining piece 5 the grooves 9, starting from a first groove coming right after the shank 3 down to a last groove 9 which is followed by the tear-off groove 7, are designed in a way that the root diameters d1, d2, etc. of the subsequent grooves increase gradually from the head 4 or shank 3 toward the free end of the tolerance rivet. The groove profile angle of opening decreases in the direction of y1, y2, etc. toward the tear-off piece 8 or toward the free end. Hence, also the groove width decreases in the direction a1, a2, etc. although the grooves 9 show an asymmetry increasing continuously towards the free end. The first groove 9 following the shank 3 possesses a mostly symmetrical shape with an approximately V-shaped cross-section, this section being located approximately symmetrical to a diametral plane according to d1. While the other grooves 9 also have V-shaped sections in the direction toward the free end of the tolerance rivet, its position and arrangement, however, shifts in terms of an increasing asymmetry, i.e. in such a way that the areas of support 19 are arranged with increasing steepness in comparison to the first groove 9. There can be a steady transition in this groove design from supporting flanks 19 are arranged with increasing inclination $X_1$, $X_2$, etc. in comparison to the first groove 9. There is a steady transition in this groove design from the first to the last groove 9. The retaining element 5 is enveloped by a cylinder jacket 21 having a diameter 22 slightly smaller than the diameter 23 of the shank 3. The service life of the tolerance rivet is favored by the comparatively great groove width a1 of the first groove 9. In the area of its root diameter d1 this first groove 9 possesses a rounded shaping according to the radius r3 (FIG. 3) or to several subsequent radii r3 and r4 (FIG. 4). By means of this rounded shaping a stress concentration in the groove root is avoided. Of importance in connection with the rounded shaping is a strain-hardened area 13 represented by crosses and having approximately an axial length 14. This rounded shaping in connection with the strain-hardened area 13 brings about an increase in the dynamic carrying capacity and thus in the service life of the tolerance rivet.

It constitutes an advantage if the transition area 15 toward the shank 3 following the area 13, which in this place is represented by dashed lines and may have an axial length 16, is also strain-hardened. One recognizes that the transition area 15 reaches about as far into the shank 3 that it will end in the cylindrical area of the shank 3. The shaping in this transition area 15 may also be rounded off, and several radii r1 and r2 may follow one another, in order to achieve a shaping similar to a three-center curve. These designs are valid for all embodiment examples of both FIGS. 3, 4 and 5.

Furthermore, FIG. 5 shows that a strain-hardening, starting from the area 13, may be provided in the root diameter d1 of the first groove 9 and also down into the area of the other ensuing groove 9. Here, a first area 17 is represented by dashed lines which borders on to the area 13 of the first groove 9 and reaches up to approximately the third groove 9. Like the areas 13 and 15, this area 17 possesses a smooth surface so that in this case the flowage of the material of the retaining collar 6 into the groove 9 is favored. A smooth design is particularly favorable in the transition area 15, because the bearing surface e of the component 1 hampers the flowage.

It is possible, in particular in the area of the grooves 9 facing the free end of the tolerance rivet, that is in the area of the last grooves 9, to provide another strain-hardened area 18, illustrated by dots. Here, it is recommendable to accomplish the strain-hardening which may for example be achieved by means of a rolling process or by blasting with shot-peening material, not with a smooth surface but with a coarse texture. In the area of these last grooves 9 there is no flow impedance of the material of the retaining collar 6 which is why in this place the material is flowing well anyway. Due to the coarse surface in the area 18, especially, in the areas of support, the transmissible prestress is increased. It is evident that in the embodiment example of FIG. 5 the clamping tool acts upon the area of a bore hole 20.

We claim:

1. A tolerance rivet for highly stressed riveted joints, comprising:

a rivet head and a free end located opposite to said head;

a shank with a length dependent on two members to be jointed by said rivet; and a retaining element cooperating with a retaining collar and having at least four circular grooves, said retaining element having a constant outer diameter slightly smaller than an outer diameter of said shank;

said grooves on said retaining element having root diameters on an enveloping jacket linking said root diameters of said grooves and widening frusto conically in a direction from said head toward said opposite free end;

said grooves on said retaining element having a groove profile with (a) an angle of opening decreasing continuously in said direction, (b) a groove width decreasing continuously in said direction, (c) an inclination of a supporting flank of the grooves increasing continuously in said direction and (d) an asymmetry increasing continuously in said direction;

said retaining element having a first groove adjacent said shank with a rounded shape in a strain-hardened area of the root diameter of said first groove, said strain-hardened area facilitating deformation of said retaining collar by providing a smooth surface with reduced surface friction for greater flowability of said retaining collar in filling said first groove; said rounded shape on said first groove preventing fracture of the rivet due to stress concentration caused by forces applied to said rivet at said respective riveted joint.

2. A tolerance rivet as defined in claim 1, wherein said shank has a strain-hardened transition area following said root diameter of said first groove in a direction toward said head.

3. A tolerance rivet as defined in claim 2, wherein said transition area has a geometric shape generated by a plurality of radii.

4. A tolerance rivet as defined in claim 2, wherein said strain-hardened areas area rolled.

5. A tolerance rivet as defined in claim 2, wherein said strain-hardening areas are produced by shot-peening.

6. A tolerance rivet as defined in claim 1, wherein grooves following said first groove are formed prior to a heat treatment.

7. A tolerance rivet as defined in claim 6, wherein said first groove has a surface with a texture that is smooth compared to surfaces of subsequent grooves.

8. A tolerance rivet as defined in claim 6, wherein said groove has a surface with a texture that is less smooth than surfaces of subsequent grooves.

9. A tolerance rivet as defined in claim 1, wherein grooves following said first groove have surfaces formed after a heat treatment.

* * * * *